April 13, 1965   F. H. CLARKE   3,177,791
FILM LOADING GUIDE
Filed May 8, 1962

INVENTOR
Frank H. Clarke
BY
ATTORNEY

United States Patent Office 3,177,791
Patented Apr. 13, 1965

3,177,791
FILM LOADING GUIDE
Frank H. Clarke, Millerton, New Brunswick, Canada
Filed May 8, 1962, Ser. No. 193,174
7 Claims. (Cl. 95—90.5)

This invention relates to a film guide for use in a developing tank. More particularly, this invention relates to improved detachable film guide means for inserting roll film on a photographic developer spool or reel used in conjunction with a developer tank.

The application of the film to a developing tank reel has always posed a difficult task to the operator as the spiral tracks disposed on the interior and opposite sides of the reel are grooved to receive the side edges of the film to be engaged and disposed in spaced helical relation therein; and such loading or application of the film must be carried on in a dark room, or in the substantial absence of light. Difficulty is thus occasioned by the particular manipulation involved which is experienced in entering the film and maintaining alignment of the film in the channels to effect a smooth, consistent flow of film into the reel with a minimum of stress and handling, and thus to avoid those factors most likely to elicit damage to the film surface and thus to the photographic reproductions attained.

One method commonly employed for loading a developer reel prior to its immersion in a developer tank is to insert in a completely unaided manual operation the leading edge of the length of film to be developed into the reel; the film once inserted, being pushed manually forward and proceeding helically inward along the slotted inner sides of the reel, the leading edge of the film describing a continually smaller circumference in its inward path, until the entire length of film is disposed in helical spaced relation within the reel structure.

An alternative and also unaided manual method of applying the film involves bowing the film strip across its width to permit its passage across the flanges bordering the grooved surfaces on the inner surfaces of the reel and to thus provide for threading of the film about the hub of the reel and extending outwardly therefrom in spaced relation in helical laterally disposed grooves of the reel.

Both of the aforesaid methods, occurring particularly under the circumstances of little or no light as noted above, require not only considerable dexterity and experience, particularly where the latter method is employed, but result in an undue amount of handling of the film which, as noted, causes injury to the film surface, particularly the sensitized face of the film which is so readily subject to smearing, scratching and like distortion.

Guide means for obviating some of the handling normally necessary and facilitating the insertion of the film have been suggested heretofore. One such guide means has been suggested to aid in loading the film by the latter method described above including winding thereof on the reel from the inside out. This device involves, however, mounting the developer reel on a bracket support member and impaling the leading edge of the film to be developed on a prong or hook positioned on the hub of the developer reel. Thus, a comparatively cumbersome and expensive piece of equipment is envisioned by the technique employing this apparatus and the element of danger to the film surface is not reduced; due to the presence of the prong or hook element. Indeed, the possibility of injury to the lead film is likely as well as the probability of injury to the hands of the operator working to attach the film to the impaling prong within the narrow lateral confines of the reel elements and in the substantial and requisite absence of light.

Similarly, guide means have been proposed for use with the aforesaid method involving loading of the film into the outer channels or grooves on the opposite interior sides of the reel side discs with subsequent inward helical winding of said film thereon. The manual technique described above and which this latter guide device was deemed to aid, requires less dexterity, distortion of the film surface and the like. However, the apparatus proposed heretofore for use with this procedure presents several material difficulties. Thus, by way of illustration, the plate upon which the film is fed into the reel is so constructed as to abut the shoulders of the reel disc rims at the point of entry of the film into the reel, by means of positioning elements disposed on the guide means; the guide plate also extends into the reel disc channels thus serving to narrow the channel width at the point of entry of the film. These and like modifications serve to create a marked tendency for the film to jam in its passage into the developer reel; causing buckling, scraping, distortion and smearing of the film, and particularly, the emulsion surface. Further, these latter devices fail to provide a receptacle for retaining the film roll during the feeding thereof to the developer reel and fail to take advantage of the curl of roll inherent in the film for use in loading the developer reel.

Accordingly, it is an objective of this invention to provide a film guide means adapted for use with an removable attachment to film reels which facilitates and simplifies significantly the insertion of the film in the reel element eliminating substantially the handling of the film in the loading process and damage to the film surface.

Another object of the invention is to provide a convenient and compact receptacle for support of the film while the latter is being unrolled and directed therefrom into the developer reel.

A further objective of this invention is the provision of a guide device which because of its unique construction and consequent relationship to the developer reel utilizes the inherent curl or roll of the film strip to effect its entry into the reel element with the substantial absence of contact of the emulsion surface of said film roll with the guide device.

These and other significant objectives of the present invention, will become evident from the following detailed description of the invention considered in concert with the accompanying drawings, showing illustrative embodiments of the invention.

Figure 2:
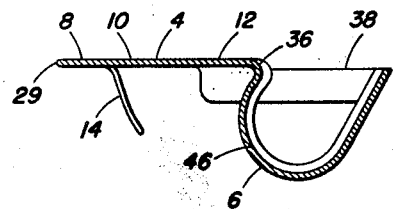
FIGURE 2 is a transverse vertical sectional view of the guide means of FIGURE 1 taken along the lines 2—2 thereof.

Referring with greater particularity to the accompanying drawings wherein like numbers designate like elements, the guide means 1 of the invention is composed of the plate element or platform 4 and the receptacle 6. The plate 4 is differentiated into an expanded head portion 8, a neck portion 10 and an expanded base 12 which is continuous with the forward end of the receptacle 6, and corresponds in width approximately with the aforesaid head 8. The plate 4 is substantially flat. Positioned at opposite sides of the plate head 8 and extending rearwardly and downwardly from the lateral extensions thereof at a point in the rearward extension of the plate 4 where the head 8 continues into the plate neck 10 and lateral thereto, are the two lugs or tabs 14 which are adapted for attachment to the developer reel 16, shown in FIGURES 3 and 4, by insertion in the recesses or stop elements 18 disposed along the inner lateral periphery of each of the reel disc members 20. These latter members 20 are of course connected by a hub or axis 21. The recesses 18 are disposed in spaced relation to the helical grooves 22, which constitutes the film tracks of the reel 16, at the outer peripheral ends 24 of said grooves 22, and, in fact, employ the same rim structure for their lower border. The developer reel 16 is of typical and well-known construction such, illustratively, as that shown in U.S. Patent 2,151,907 issued on March 28, 1939 to L. R. Fink. The tabs 14 of the loader device 1 are so disposed as to length and angle relative to the head 8, and the latter is of such a length when positioned in attached relation to the reel 16 that the forward end of the plate head 8 is disposed tangentially to the outer end 24 of the helical groove 22 prior to the break 26 occurring in each of the outer rims 28, of the reel discs 20; the plate head 8 extending through the entry or break 26 occurring in each of the outer rims 28 of the reel discs 20 and spanning the distance between the inner sides of the reel discs 16; the forward extension or lead edge 29 of the plate 8 terminating shortly after bridging the entry way 26; and spaced from the aforesaid groove endings 24. The guide lugs or tabs 14 thus disposed, further secure the guide device 1 in position against lateral or rearward displacement or shift with relation to the reel 16. The guide means 1 is readily removed from attachment of the reel 16 by shifting of the device 1 forward relative to the reel 16. During the loading stage, however, the film 30 (see FIGURE 3) being inserted over the plate 4 into the outer ends 24 of the helical grooves or channels 22, and spirally inward therefrom, the entire bias of reel movement is forward; but is held in stationary position by means of the guide device 1 and the removably interlocked tabs 14 thereof, the guide means 1 being held by the operator in substantially stationary position. A particular advantage of this construction is that the plate 4 is retained during the film loading operation over and adjacent the rearwardly disposed termini 31 at the posterior borders of the entry ways 26 under which the recesses 18 are disposed; and thus as far removed as possible rearwardly from the forward terminations 32 of the outer rims 28. Thus, the greatest possible space in the entry way or break 26 in each of the rims 28 remains available for passage of film over the plate 4 into the reel 16. It is this provision of space together with the tangential disposition of the plate 4 of the guide means 1 in spaced relation to the grooves 22, which permits and provides for the utilization of the inherent curl or roll of the film in loading the developer reel, as described hereinafter.

Figure 1:
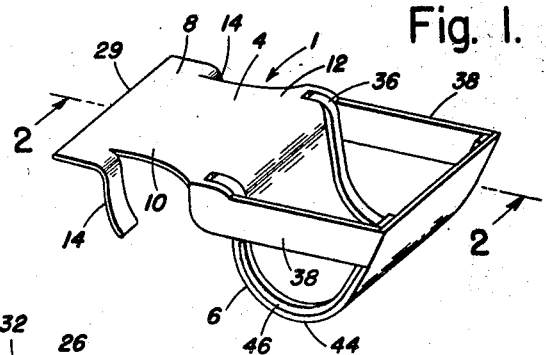
FIGURE 1 is a perspective view of the film guide device of the invention.
Figure 3:
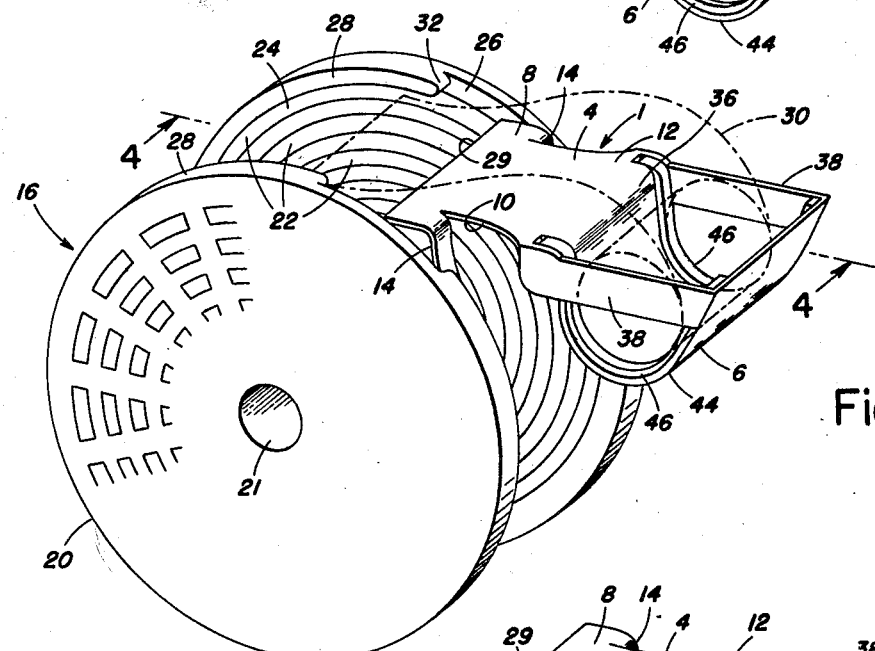
FIGURE 3 is a perspective view of the film guide device of FIGURE 1 attached in operative relationship to a film developer reel and shows the method of application of the film to the reel employing the guide device of the invention.
Figure 5:
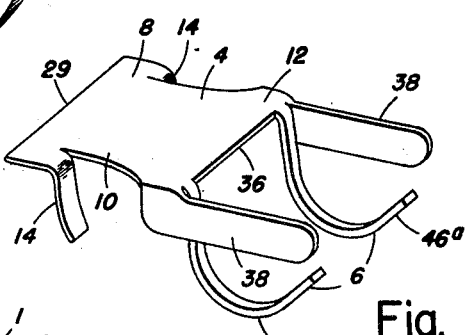
FIGURE 5 shows a modification of the film guide device of the invention in a perspective view.
Figure 4:
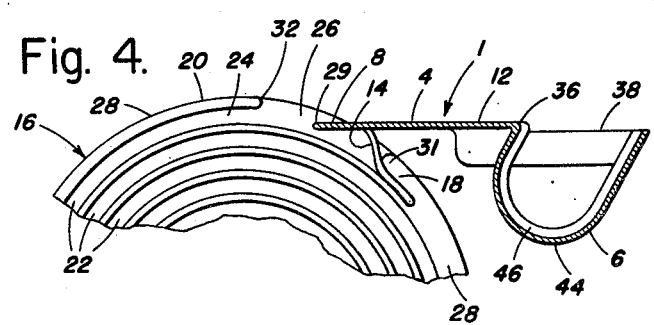
FIGURE 4 is a fragmentary vertical sectional view showing the guide device and a portion of the developer reel of FIGURE 3 taken along the lines 4—4 thereof, and showing the removable attachment effected between the reel and guide elements.

The laterally expanded base 12 of the plate 4 is continuous with the receptacle 6. The latter component 6 is a longitudinally concave body disposed below the level of the plate 4 and is adapted to receive a roll of film to be fed to the developer reel 16. The concave interior surface of the receptacle 6 thus forms a pocket from which the lead edge of the film is withdrawn and led over the plate 4 to the forward edge of the plate head portion 8 thereof from which it is pushed into the reel 16. The nexus 36 of the receptacle 6 and the base 12 of the plate 4 forms most desirably a transverse reverse curvature which represents a significant aspect of the present invention. This reverse curvature serves to prevent the film roll remaining in the receptacle 6 from climbing out of the receptacle as the film is moved forward on the reel 16. The guide means 1 of FIGURES 1, 3 and 5 show how the device of applicant's invention would appear without the aforesaid curvature at the nexus 36. It is noted in this regard, that the inherent clock spring disposition of a film roll 30 will normally vary directly with the thickness of the film. Thus, the reverse curvature at the nexus 36 may be gentle or relatively sharp as seen, for example, in FIGURES 2 and 4, respectively; the curvature being more sharply pronounced preferably, i.e. in FIGURE 4, where the coil spring tension in the film is greater. The concave formation of the receptacle 6 is adequate to prevent the film from escaping through the rear end thereof, when passed to the plate 4 and reel 16 as seen, for example, in FIGURE 3.

It is the tangential disposition of the plate 4 also with relation to the outer ends 24 of the helical grooves 22 which permits the receptacle 6 to be positioned, in the attached stage of the device or loader 1, close to the reel 16, without interfering with the operation thereof; and concomitantly permits the plate 4 to be sufficiently short in length to permit the natural longitudinal curl of the film roll to be utilized in depositing the film in the reel 16.

Guide walls, that is side walls or cross-bars 38, as seen in FIGURES 1 to 4, are present about the receptacle 6 to prevent lateral displacement therefrom and to serve in guiding the position of the film roll relative to the plate 4. These side walls or cross-bars 38, are vertically aligned with relation to the receptacle 6 and plate member 4 and extend longitudinally and horizontally from the lateral borders of the base portion 12 of the plate 4 to the upper lateral rear sides of the concave receptacle 6 or may be free-floating at their posterior ends as seen in FIGURE 5. The side walls or crossbars 38 may, of course, be omitted but this alternative is normally and obviously undesirable. It is noted that the side walls 38 are spaced to abut substantially the lateral edges of the film roll 30 but are so provided as to permit free rotation of the film roll 30 in the receptacle 6.

The concavity forming the receptacle 6 is seen to be constructed in FIGURES 1 to 5 with a recessed central portion 44 longitudinally disposed so that only the unexposed edges of the film roll are in contact with the lateral margins 46 of the receptacle 6. The recessed central portion 44 may, however, be omitted if desired so that only the concave lateral margins seen as the prongs 46a in FIGURE 5 remain as support members for the film roll. The marginal support members 46 may be coated with felt, Scotch tape (trade name) or the like on the concave side of the receptacle 6 in either event to eliminate scratching of even the unexposed surface of the film as much as possible. This protective material positioned along the lateral borders 46 of the receptacle or support means 6 may serve to render the central portion 44 of the receptacle 6 recessed, where present. Of course, if desired, the central area 44 may be recessed and buffered with similar protective material to that employed in the lateral raised margins 46. Indeed, the entire loading device 1, made ordinarily from a single metal stamping (e.g. steel) or as a single blow-molded plastic article wherein the plastic is, for example, a high density polyolefin, e.g. polyethylene having a density of at least 0.92 or polypropylene, may be coated with a cushioning material, if desired, but is not, however, at all necessary.

The loading process for employing the device 1 of the invention will thus be seen to involve, illustratively, placing the loader or guide means 1 in attached tangential relation with the developer reel 16 as described above; inserting the film roll into the guide receptacle 6 where it will be in contact with the lateral margin support elements 46; drawing the lead edge of the film roll with the emulsion side of the film on the under side forward over the base 12 and neck 10 of the plate or platform 4 to the leading edge of the head portion 8 thereof. The film leaves the receptacle 6 above the platform 4 due to its inherent curl or roll, and passes through the break or entry 26 in the outer rims 28 of the reel discs 20 and is pressured lightly downward to the leading edge of the platform 4 and then forward into the peripheral ends 24 of the helical channels 22 in the reel 16. The remainder of the film roll 30 may then be moved forward from the receptacle 6 over the plate 4 and above the leading edge 29 of the head 8 into the reel 16. After the leading edge of the film passes into the peripheral ends 24 of the helical channels 22 in the reel 16, the light downward pressure exerted against the unwinding film roll may be released. The inherent curl of the film then provides for the continued unwinding of the film with the unsensitized surface thereof biased against the forward termini 32 of the outer rim 28 of the reel 16, thus providing unique protection for the film roll in the loading stage. Unwinding is continued until the reel 16 contains the entire film roll in a helical spaced arrangement, whereupon the guide means 1 may be withdrawn from the reel 16 by movement thereof forward so that the tabs 14 are withdrawn from the reel recesses 18 and the device 1 is thus taken out of engagement with the reel 16. The reel may then be placed in the developer bath. Variations in this technique are of course available such, illustratively, as the insertion of the film roll in the receptacle 6 prior to attachment of the guide means 1 to the reel 16.

Variations are, of course, also feasible in the reel means to which the guide means 1 of the invention is attached. Thus, in a developer reel from which recesses 18 are absent, there may be employed spring clip elements which are adapted to engage the tabs 14.

Similarly, standard wire reels designed for loading from the interior may be readapted for loading from the exterior employing the guide means of the invention by application of spring loaded discs to the lateral borders of the wire reel. The discs in this instance are cast with grooves so provided on the interior lateral borders thereof as to receive the spiral wire reel in a manner which permits the laterally disposed discs, in concert with the wire coiled reel disposed therein, to simulate for loading purposes the reel 16 described hereinabove. Recesses 18, to receive the tabs 14 of the guide means 1, are provided in this construction in the same manner as in the reel discs 20 of the drawings.

What is claimed is:

1. A removable film loading guide for employment with a film developer reel, said reel being formed of spaced reel discs, a hub connecting said reel discs and helical film tracks arranged upon said discs and disposed about said hub so that peripheral entry ways into said film tracks interrupt the rims of said reel discs at a common point, said guide comprising a platform adapted to span the distance between said discs; said platform being substantially level in configuration; a receptacle positioned at the posterior end of said platform remote from the lead edge of said platform; and guide lugs disposed along the lateral borders of said platform and extending downwardly therefrom and adapted to engage the rims of said reel discs under the posterior borders of said entry ways.

2. A detachable film guide for employment in loading a film developer reel, said reel being formed of spaced reel discs, a hub connecting said reel discs and helical film tracks arranged upon the interior sides of said discs and disposed about said hub so that peripheral entry ways into said film tracks interrupt the rims of said reel discs at a common point; said guide comprising a platform adapted to span the distance between said discs, said platform being substantially level in configuration; a receptacle positioned at the posterior end of said platform remote from the lead edge of said platform, said receptacle defining a longitudinal concavity adapted to receive a film roll to be fed into said reel across said platform; and guide lugs disposed along the lateral borders of said platform and extending downwardly therefrom and adapted to engage the rims of said reel discs under the posterior borders of said entry ways; said lugs being further adapted for cooperation with the lateral borders of said reel discs for maintaining the platform of said guide device in substantially tangential relation to the outer peripheral end of the aforesaid helical film tracks of said reel.

3. A detachable film guide for employment in loading a film developer reel, said reel being formed of spaced reel discs, a hub connecting said reel discs, and helical film tracks arranged upon the interior sides of said discs and disposed about said hub so that peripheral entry ways into said film tracks interrupt the outer rims of said reel discs at a common point in their circumferences; said guide comprising a platform adapted to span the distance between said discs, said platform being substantially level in configuration; a receptacle positioned at the posterior end of said platform remote from the lead edge of said platform, said receptacle defining a longitudinal concavity adapted to receive a film roll to be fed into said reel across said platform; guide members being disposed along the lateral borders of said concavity; and guide lugs disposed along the lateral borders of said platform and extending downwardly therefrom and adapted to engage the rims of said reel discs under the posterior borders of said entry ways, said lugs being adapted to maintain the platform of said guide device across the entry ways of said reel discs and in substantially tangential relation to the outer peripheral end of the aforesaid helical film tracks of said reel.

4. A detachable film guide device for employment in loading a film developer reel, said reel being formed of spaced reel discs, a hub connecting said reel discs, and helical film tracks arranged upon the interior sides of said discs and disposed about said hub so that peripheral entry ways into said film tracks interrupt the rims of said reel discs at a common point in their circumference, and stop elements positioned underneath the rims provided at the posterior borders of said entry ways, said guide device comprising a platform adapted to span the distance between said discs; said platform being substantially level in configuration; guide lugs disposed along the lateral borders of said platform and extending downwardly and rearwardly therefrom and adapted to engage the stop elements of the reel discs positioned under the posterior borders of the entry ways to said discs, and adapted to maintain the platform of said guide device across the entry ways to said reel and the lead edge of said platform in tangential relation to the outer peripheral ends of the aforesaid helical film tracks of said reel; a receptacle positioned at the posterior end of said platform remote from the lead edge of said platform, said receptacle defining a longitudinal concavity adapted to receive a film roll to be fed into said reel across said platform.

5. A detachable film guide device for employment in loading a film developer reel, said reel being formed of spaced reel discs, disposed about a common axis, a hub connecting said reel discs, and helical film tracks arranged upon the interior sides of said discs and disposed about said hub axis so that peripheral entry ways into said film tracks interrupt the rims of said reel discs at a common point in their circumferences, and stop elements positioned underneath the rims provided at the posterior borders of said entry ways; said guide device comprising a platform adapted to span the distance between said discs, said platform being substantially level in configuration; guide lugs disposed along the lateral borders of said platform and extending downwardly and rearwardly therefrom and adapted to engage the stop elements of the reel discs positioned under the posterior borders of the entry ways to said discs, and adapted to maintain the platform of said guide device across said entry ways and in tangential relation to the outer peripheral end of the aforesaid helical film tracks of said reel; a receptacle positioned at the posterior end of said platform and continuous therewith; said platform and said receptacle defining at their nexus a transversely disposed reverse curve descending into the receptacle which is disposed below the level of said platform; said receptacle defining a longitudinally disposed concavity, the lateral margins of which are adapted to receive and support a film roll to be fed across said platform and into said reel; and flattened guide members disposed along the sides of said receptacle to guide and provide lateral support for said film roll in said receptacle.

6. The guide device of claim 5, wherein the receptacle is a longitudinally disposed concavity composed of raised lateral margins and a recessed central surface.

7. The guide device of claim 5, wherein the receptacle is a longitudinally disposed concavity composed of lateral marginal prongs which serve to define the aforesaid concavity.

References Cited by the Examiner
UNITED STATES PATENTS

| | | | |
|---|---|---|---|
| 2,151,907 | 3/39 | Fink | 242—77.1 |
| 2,203,963 | 6/40 | Lange | 95—90.5 |
| 2,297,525 | 9/42 | Anheuser | 95—90.5 X |
| 2,548,323 | 4/51 | Shimizu | 95—100 |
| 2,562,877 | 8/51 | Balluff | 95—90.5 |

NORTON ANSHER, *Primary Examiner.*

D. B. LOWE, *Examiner.*